US009478171B2

(12) United States Patent
Song et al.

(10) Patent No.: US 9,478,171 B2
(45) Date of Patent: Oct. 25, 2016

(54) DISPLAY DEVICE AND METHOD FOR OPERATING THE DISPLAY DEVICE

(71) Applicant: Samsung Display Co., Ltd., Yongin, Gyeonggi-Do (KR)

(72) Inventors: Jun Yong Song, Hwaseong-si (KR); Myeong Su Kim, Hwaseong-si (KR); Jae Hoon Lee, Seoul (KR); Jeong Bong Lee, Busan (KR)

(73) Assignee: SAMSUNG DISPLAY CO., LTD. (KR)

( * ) Notice: Subject to any disclaimer, the term of this patent is extended or adjusted under 35 U.S.C. 154(b) by 223 days.

(21) Appl. No.: 14/020,646

(22) Filed: Sep. 6, 2013

(65) Prior Publication Data

US 2014/0340380 A1 Nov. 20, 2014

(30) Foreign Application Priority Data

May 15, 2013 (KR) ........................ 10-2013-0055013

(51) Int. Cl.

*G06F 3/038* (2013.01)
*G09G 5/00* (2006.01)
*G09G 3/36* (2006.01)
*G09G 3/32* (2016.01)
*G09G 3/34* (2006.01)

(52) U.S. Cl.

CPC .......... *G09G 3/3266* (2013.01); *G09G 3/3473* (2013.01); *G09G 3/3677* (2013.01); *G09G 2310/0267* (2013.01); *G09G 2330/04* (2013.01)

(58) Field of Classification Search

CPC .................. G09G 3/3677; G09G 2310/0286; G09G 3/006; G09G 2330/08

See application file for complete search history.

(56) References Cited

U.S. PATENT DOCUMENTS

| | | | | |
|---|---|---|---|---|
| 7,791,579 | B2 | 9/2010 | Choi | |
| 7,796,202 | B2 | 9/2010 | Hwang et al. | |
| 8,243,058 | B2 | 8/2012 | Lee et al. | |
| 8,253,721 | B2 | 8/2012 | Lee | |
| 8,289,256 | B2 | 10/2012 | Jeong et al. | |
| 2006/0159365 | A1 * | 7/2006 | Chang | 382/275 |
| 2006/0256066 | A1 * | 11/2006 | Moon | 345/100 |
| 2007/0164969 | A1 * | 7/2007 | Kim | G09G 3/3611 345/99 |
| 2008/0122824 | A1 * | 5/2008 | Lee | 345/211 |
| 2008/0165110 | A1 | 7/2008 | Kim et al. | |
| 2010/0039363 | A1 * | 2/2010 | Lee et al. | 345/100 |
| 2010/0207928 | A1 | 8/2010 | Lee et al. | |
| 2011/0122117 | A1 * | 5/2011 | Lee et al. | 345/211 |
| 2012/0038616 | A1 | 2/2012 | Song et al. | |
| 2012/0098800 | A1 | 4/2012 | Kim et al. | |
| 2012/0162187 | A1 | 6/2012 | Lee et al. | |
| 2013/0038587 | A1 | 2/2013 | Song et al. | |

FOREIGN PATENT DOCUMENTS

| | | |
|---|---|---|
| KR | 10-2008-0052907 | 6/2008 |
| KR | 10-2010-0094613 | 8/2010 |
| KR | 10-2011-0058396 | 6/2011 |
| KR | 10-2014-0023711 | 2/2014 |

* cited by examiner

*Primary Examiner* — Alexander Eisen
*Assistant Examiner* — Nan-Ying Yang
(74) *Attorney, Agent, or Firm* — Innovation Counsel LLP

(57) ABSTRACT

A display device includes a plurality of pixels. The display device further includes a plurality of gate lines. The display device further includes a gate driver configured provide a plurality of gate signals through the plurality of gate lines to the plurality of pixels according to at least one of a discharge signal and a scanning start signal for controlling the plurality of pixels, the gate driver being configured to provide a plurality of gate-off signals through the plurality of gate lines to the plurality of pixels according to the discharge signal. The display device further includes a signal provider configured to provide the discharge signal to the gate driver when the signal provider determines that an image signal is abnormal.

19 Claims, 5 Drawing Sheets

DISPLAY DEVICE AND METHOD FOR OPERATING THE DISPLAY DEVICE

CROSS-REFERENCE TO RELATED APPLICATION

This application claims priority to and the benefit of Korean Patent Application No. 10-2013-0055013 filed in the Korean Intellectual Property Office on May 15, 2013, the entire contents of which are incorporated herein by reference.

BACKGROUND (a) Technical Field

The present invention relates to a display device and a method for operating the display device.

(b) Description of the Related Art

Operation of display devices may be influenced by static electricity. Failures of display devices caused by static electricity may be generally classified into hard failures and soft failures. In a hard failure, an element of a display device is damaged due to static electricity, such that the element cannot recover to a substantially functional state even if the device is restarted or reset. In a soft failure, no element in a display device is substantially damaged, and the device may function normally after reset. Nevertheless, in a soft failure, one or more elements, such as a signal controller or a driving IC, of the display device may not receive or transmit a normal signal. As a result, the display device may display an abnormal image.

The above information disclosed in this Background section is for enhancement of understanding of the background of the invention. The Background section may contain information that does not form the prior art that is already known in this country to a person of ordinary skill in the art.

SUMMARY

One or more embodiments of present invention may prevent a viewer of a display device from perceiving conspicuous artifacts or distortion in a displayed image when the display device is affected by static electricity.

One or more embodiments of the invention may be related to a display device that includes a plurality of pixels. The display device may further include a plurality of gate lines. The display device may further include a gate driver configured provide a plurality of gate signals through the plurality of gate lines to the plurality of pixels according to at least one of a discharge signal and a scanning start signal for controlling the plurality of pixels, the gate driver being configured to provide a plurality of gate-off signals through the plurality of gate lines to the plurality of pixels according to the discharge signal. The display device may further include a signal provider configured to provide the discharge signal to the gate driver when the signal provider determines that an image signal is abnormal.

The signal provider may include the following elements: a signal controller configured to provide the image signal; and a data driver configured to compare the image signal with a predetermined format for determining whether the image signal is abnormal, the data driver being further configured to provide a plurality of data signals to the plurality of pixels.

The plurality of pixels may include a first pixel, a second pixel, and a third pixel. The plurality of gate lines includes a first gate line, a second gate line, and a third gate line. The gate driver may include a first stage, a second stage, and a third stage. The first stage is electrically connected through the first gate line to the first pixel. The second stage may be electrically connected through the second gate line to the second pixel. The third stage may be electrically connected through the third gate line to the third pixel. Each of the second stage and the third stage may include at least one more signal input terminal than the first stage.

Each of the first stage, the second stage, and the third stage may include an input unit, an inverter unit, a transmittance signal unit, a pull-up unit, and a pull-down unit. Each of the second stage and the third stage may additionally include a discharge unit. The first stage may not include the discharge unit.

The discharge unit may be configured to discharge, in response to the discharge signal, a charge that has been charged in the pull-up unit.

The display device may include a scanning start signal line configured to transmit at least one of the discharge signal and the scanning start signal. The scanning start signal line may be electrically connected to each of the input unit of the first stage, the discharge unit of the second stage, and the discharge unit of the third stage.

The gate driver may include a second-to-last stage, a last stage, a first dummy stage, and a second dummy stage. Each of the first dummy stage and the second dummy stage may not be electrically connected to any pixel. A first signal input terminal of the last stage may be electrically connected to a signal output terminal of the second-to-last stage. A second signal input terminal of the last stage may be electrically connected to a signal output terminal of the first dummy stage. A third signal input terminal of the last stage may be electrically connected to a signal output terminal of the second dummy stage. A fourth signal input terminal of the last stage may be electrically connected to the scanning start signal line.

The second stage may include a clock signal terminal, a gate signal output terminal, and a first voltage input terminal.

The pull-up unit of the second stage may include a pull-up transistor and a capacitor. An input terminal of the pull-up transistor may be electrically connected to the clock signal terminal. An output terminal of the pull-up transistor may be electrically connected to the gate signal output terminal. A control terminal of the pull-up transistor may be electrically connected to the discharge unit of the second stage. The capacitor may be electrically connected between the control terminal of the pull-up transistor and the output terminal of the pull-up transistor.

The discharge unit of the second stage may include a discharge transistor. An input terminal of the discharge transistor may be electrically connected to the first voltage input terminal. An output terminal of the discharge transistor may be electrically connected to the control terminal of the pull-up transistor. A control terminal of the discharge transistor may be electrically connected to the scanning start signal line, The input unit of the second stage may include an input transistor. Each of an input terminal of the input transistor and a control terminal of the input transistor may be electrically connected to a gate signal output terminal of the first stage. An output terminal of the input transistor may be electrically connected to the control terminal of the pull-up transistor.

The second stage may include a second voltage input terminal.

The pull-down unit of the second stage may include a pull-down transistor. An input terminal of the pull-down transistor may be electrically connected to the second voltage input terminal.

The inverter unit of the second stage may include a first inverter transistor and a second inverter transistor. Each of a first terminal of the first inverter transistor and a control terminal of the second inverter transistor may be electrically connected to an output terminal of the pull-down transistor. Each of a second terminal of the first inverter transistor, a control terminal of the first inverter transistor, and an input or output terminal of the second inverter transistor is electrically connected to the clock signal terminal.

A voltage at the first voltage input terminal may be lower than a voltage at the second voltage input terminal.

The input unit of the first stage may include a switching element. Each of an input terminal of the input transistor and a control terminal of the switching element may be electrically connected to the scanning start signal line. An output terminal of the switching element may be electrically connected to a control terminal of the pull-up unit of the first stage.

The signal provider may include the following elements: a digital-analog converter configured to provide at least one of the discharge signal and the scanning start signal to the gate driver; a signal controller configured to provide the image signal; and a data driver configured to determine whether the image signal is abnormal, the data driver being further configured to provide a plurality of data signals to the plurality of pixels. The signal controller may be configured to provide a discharge indication signal to the digital-analog converter when the image signal is abnormal. The digital-analog converter may be configured to generate the discharge signal according to the discharge indication signal.

The data driver may be configured to provide a first-state lock signal to the signal controller if the image signal is determined to be normal. The data driver may be configured to provide a second-state lock signal to the signal controller if the image signal is determined to be abnormal. The first-state lock signal may be different from the second-state lock signal.

The signal controller may be configured to provide a first-level vertical clock signal to the digital-analog converter in response to the first-state lock signal. The signal controller may be configured to provide a second-level vertical clock signal to the digital-analog converter in response to the second-state lock signal. The digital-analog converter may be configured to provide an off-level gate clock signal to the gate driver in response to the second-level vertical clock signal.

One or more embodiments of the invention may be related to a method for operating a display device. The display device may include a plurality of pixels, a plurality of gate lines, and a gate driver electrically connected though the plurality of gate lines to the plurality of pixels. The method may include the following steps: determining, using a signal provider that includes hardware, whether an image signal is abnormal; after determining that the image signal is abnormal, using the signal provider to provide a discharge signal to the gate driver; and using the gate driver to provide, in response to the discharge signal, a plurality of gate-off signals through the plurality of gate lines to the plurality of pixels.

The method may further include the following step: transmitting the discharge signal through a scanning start signal line to the gate driver. The gate driver may be configured to receive a scanning start signal that is transmitted through the scanning start signal line.

The method may include the following step: after determining that the image signal is abnormal, using the signal provider to provide an off-level gate clock signal to the gate driver.

The gate driver may include a first stage and a second stage. The method may include the following steps: providing a first copy of the discharge signal to a first signal input terminal of the first stage; providing a first copy of a first gate signal from the first stage to a first pixel of the plurality of pixels; providing a second copy of the first gate signal from the first stage to a first signal input terminal of the second stage; and providing a second copy of the discharge signal to a second signal input terminal of the second stage.

The gate driver may include a second-to-last stage, a last stage, a first dummy stage, and a second dummy stage. Each of the first dummy stage and the second dummy stage may not be electrically connected to any pixel. The method may include the following steps: providing a gate signal from the second-to-last stage to a first signal input terminal of the last stage; providing a first transmittance signal from the first dummy stage to a second signal input terminal of the last stage; providing a second transmittance signal from the second dummy stage to a third signal input terminal of the last stage; and providing a copy of the discharge signal to a fourth signal input terminal of the last stage.

One or more embodiments of the present invention may be related to a display device that includes the following elements: a data driver configured to apply data signals to data lines; a gate driver including a plurality of stages applying gate signals to gate lines; and a signal controller configured to control the data driver and the gate driver, in which when failure occurs in a signal exchange between the data driver and the signal controller, the signal controller discharges at least one stage among the plurality of stages.

The display device may further include a DA (digital-analog) converter configured to change a level of a gate control signal transmitted from the signal controller to the gate driver. The DA converter may be connected to each of the plurality of stages through a scanning start signal line.

The plurality of stages may include a plurality of main stages and dummy stages, wherein the first main stage in the plurality of main stages has a structure that is different from those of the main stages other than the first main stage. Each of the plurality of stages may include an input unit, an inverter unit, a transmittance signal unit, a pull-up unit, and a pull-down unit, and the main stages other than the first main stage may further include a discharge unit, compared to the first main stage. The discharge unit may discharge charges charged in the pull-up unit according to a discharge signal received through the scanning start signal line. The input unit of the first main stage may be connected to the scanning start signal line, and the discharge units of the main stages other than the first main stage may be connected to the scanning start signal lines. Each of the dummy stages may have a structure that is analogous to that of the first main stage, and the scanning start signal line may be connected to the input unit of each dummy stage.

The pull-up unit may include a pull-up transistor having an input terminal connected to a clock signal terminal, an output terminal connected to a gate signal output terminal, and a control terminal connected to the discharge unit. The pull-up unit may further include a capacitor connected between a control terminal and an output terminal of the pull-up transistor. The discharge unit may include a discharge transistor having an input terminal connected to a low voltage input terminal, an output terminal connected to the control terminal of the pull-up transistor, and a control terminal connected to the scanning start signal line. The input unit may include an input transistor having an input terminal and a control terminal commonly connected to the scanning start signal line or connected to a gate signal output terminal of the previous stage, and an output terminal connected to the control terminal of the pull-up transistor.

When failure or abnormality occurs in a signal exchange between the data driver and the signal controller, the signal controller may generate a discharge indication signal and output the generated discharge indication signal to the DA converter, and the DA converter may generate a discharge signal according to the discharge indication signal and output the generated discharge signal to each stage of the gate driver through the scanning start signal line.

The data driver may notify of an occurrence of the failure or abnormality in the signal exchange between the data driver and the signal controller by identifying whether an output image signal received from the signal controller corresponds to a predetermined format, changing a state of a lock signal to a high state and outputting the changed lock signal with the high state to the signal controller when the output image signal received from the signal controller corresponds to the predetermined format, and changing the state of the lock signal to a low state and outputting the changed lock signal with the low state to the signal controller when the output image signal received from the signal controller does not correspond to the predetermined format.

When the failure or abnormality occurs in the signal exchange between the data driver and the signal controller, the signal controller may switch a level of a vertical clock signal to a low level and may output the vertical clock signal of the low level to the DA converter, and the DA converter may switch levels of all of the gate clock signals to an off-level according to the vertical clock signal of the low level and may output the gate clock signals of the off-level to the clock signal terminal of the gate driver.

The plurality of stages may include a plurality of main stages and dummy stages. When failure or abnormality occurs in a signal exchange between the data driver and the signal controller, the signal controller may discharge the main stages other than the first main stage.

One or more embodiments of the present invention may be related to a method for operating a display device. The method may include the following steps: identifying whether an output image signal corresponds to a predetermined format; generating a discharge signal when the output image signal does not correspond to the predetermined format; and discharging at least one stage among a plurality of stages of a gate driver according to the discharge signal.

The method may further include, when the output image signal does not correspond to the predetermined format, maintaining gate clock signals at an off level.

The plurality of stages may include a plurality of main stages and dummy stages. When the output image signal does not correspond to the predetermined format, the main stages other than the first main stage may be discharged.

According to embodiments of the present invention, when a soft fail or image signal abnormality occurs, the voltages of the gate lines may be maintained at the off voltage, a charge that has been charged in each stage of the gate driver may be discharged through a charge discharging unit, and the gate clock signals CLK and CLKB may be maintained at the off level. Accordingly, a previously displayed image may remain displayed, such that no conspicuous abnormal image may be displayed. Advantageously, satisfactory viewer experience may be provided.

DETAILED DESCRIPTION OF THE EMBODIMENTS

The present invention will be described more fully hereinafter with reference to the accompanying drawings, in which embodiments of the invention are shown. As those skilled in the art would realize, the described embodiments may be modified in various different ways, all without departing from the spirit or scope of the present invention. In the description, for conciseness, the term "connect" may represent "electrically connect".

Although the terms first, second, etc. may be used herein to describe various signals, elements, components, regions, layers, and/or sections, these signals, elements, components, regions, layers, and/or sections should not be limited by these terms. These terms may be used to distinguish one signal, element, component, region, layer, or section from another signal, region, layer, or section. Thus, a first signal, element, component, region, layer, or section discussed below may be termed a second signal, element, component, region, layer, or section without departing from the teachings of the present invention. The description of an element as a "first" element may not require or imply the presence of a second element or other elements. The terms first, second, etc. may also be used herein to differentiate different categories of elements. For conciseness, the terms first, second, etc. may represent first-type (or first-category), second-type (or second-category), etc., respectively.

Various embodiments are described herein below, including methods and techniques. Embodiments of the invention might also cover an article of manufacture that includes a non-transitory computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed and may include a combination of a computer/computing device and dedicated/programmable hardware circuits (such as electrical, mechanical, and/or optical circuits) adapted for the various operations pertaining to embodiments of the invention.

Figure 1:
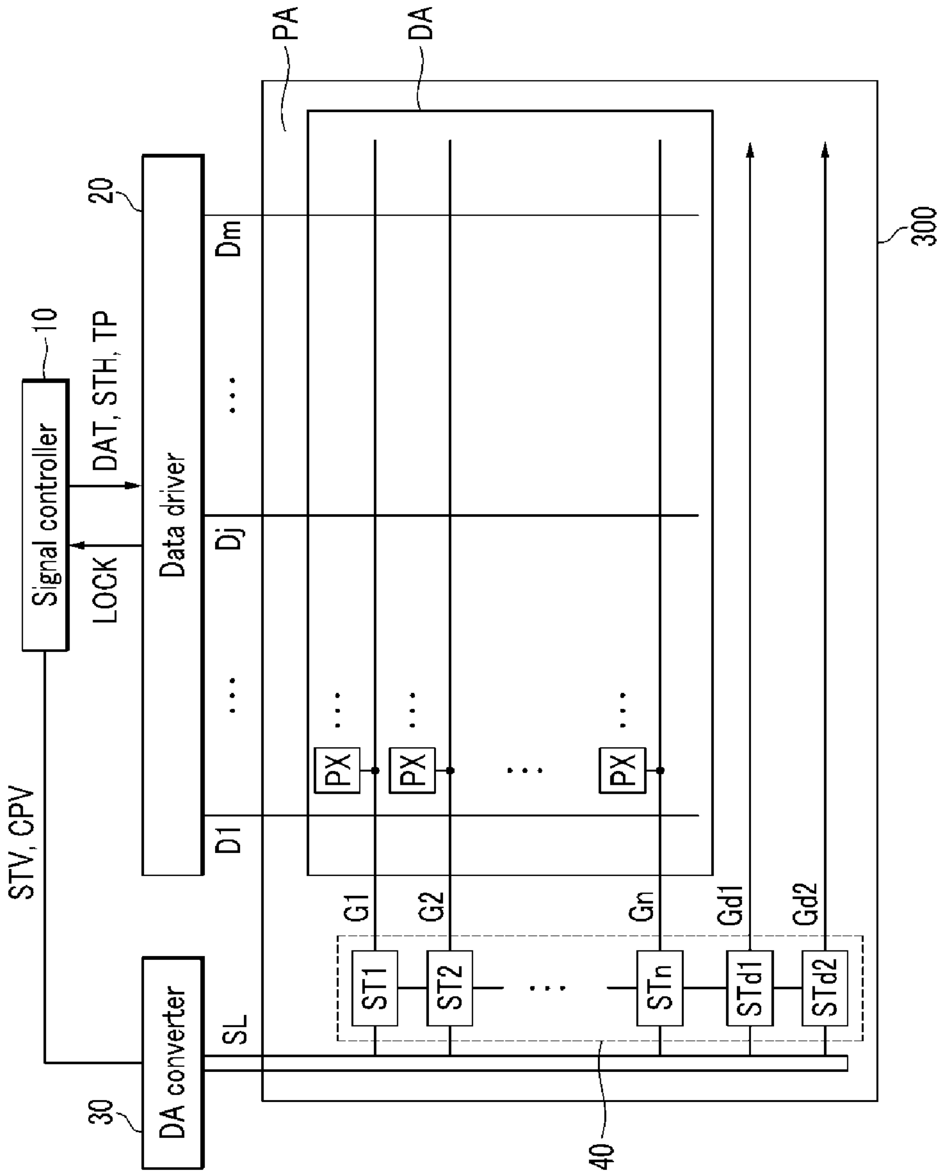
FIG. 1 is a block diagram illustrating a display device according to an embodiment of the present invention.

FIG. 1 is a block diagram illustrating a display device according to an embodiment of the present invention.

The display device includes a display panel 300, a signal controller Tcon 10, a data driver 20, a digital-to-analog converter 30 (or DA converter 30), and a gate driver 40.

The display panel 300 may be one of various flat panel displays (FPD). For example, the display panel 300 may be a liquid crystal display (LCD), an organic light emitting display (OLED), or an electrowetting display (EWD).

The display panel 300 includes a display area DA for displaying an image and includes a non-display area that neighbors the display area DA.

The display panel 300 may include a plurality of gate lines G1 to Gn, a plurality of data lines D1 to Dm, and a plurality of pixels PXs connected with the plurality of gate lines G1 to Gn and the plurality of data lines D1 to Dm. The pixels PXs are positioned in the display area DA.

The gate lines G1 to Gn may transmit gate signals, may be extended in a substantially row direction, and may be substantially parallel to each other. The data lines D1 to Dm may transmit data voltages corresponding to an image signal, may be extended in a substantially column direction, and may be substantially parallel to each other.

The pixels PXs may be arranged in a matrix form. Each pixel PX may include a switching element (not illustrated) connected with a corresponding gate line Gi and a corresponding data line Dj, and may include a pixel electrode (not illustrated) connected to the switching element.

The non-display area of the display panel 300 includes a peripheral area PA that neighbors the display area DA. The peripheral area PA may be enclosed by a light blocking member, such as a bezel. The peripheral area PA may substantially surround the display area DA and/or may be positioned at an edge of the display panel 300.

The gate driver 40 and one or more control signal lines SL may be positioned in the peripheral area PA. The gate driver 40, which may include amorphous silicon gates (ASGs), may be integrated may be mounted in the peripheral area PA in a form of a driving chip. The data driver 20 may be disposed outside the peripheral area PA of the display panel 300, or may be mounted in the peripheral area PA of the display panel 300 in a form of a plurality of driving chips. The gate lines G1 to Gn (which are connected to the gate driver 40) and the data line D1 to Dm (which are connected to the data driver) may extend to the display area DA from the peripheral area PA.

The signal controller 10 may receive an input image signal and an input control signal from an external graphic controller (not illustrated) and may accordingly generate an output image signal DAT, a gate control signal, a data control signal, etc. The input control signal may include a vertical synchronization signal, a horizontal synchronizing signal, a main clock signal, and a data enable signal. The signal controller 10 may transmit the gate control signal to the DA converter 30 and may transmit the data control signal and an output image signal DAT to the data driver 20. The gate control signal includes a vertical synchronization start signal STV (for instructing an output start of a gate-on pulse) and a vertical clock signal CPV (for controlling an output timing of the gate-on pulse). The data control signal may include a horizontal synchronization start signal STH (for instructing an input start of the output image signal DAT) and a load signal TP (for instructing an application of a corresponding data voltage to the data line). A clock signal, of which timing may be periodically checked, may be included in the output image signal DAT. In an embodiment, the vertical synchronization start signal STV may include a pulse (i.e., a scanning start signal STV) for indicating a start of each frame and may include a pulse (i.e., a discharge indication signal STV_DC) for indicating that a signal state is abnormal due to static electricity, etc.

According to the data control signal, The data driver 20 may receive the output image signals DAT for one pixel row from the signal controller 10. The data driver 20 may convert the received output image signals DAT to analog data voltages corresponding to the respective output image signals DAT and may apply the converted analog data voltages to the data lines D1 to Dm. Using the clock signal included in the output image signal DAT, the data driver 20 may determine whether the output image signal DAT corresponds to a predetermined format. If the output image signal DAT corresponds to the predetermined format, the data driver 20 may recognize the output image signal DAT as a normal signal and may switch a level of a lock signal LOCK to be transmitted to the signal controller 10 from a low level to a high level. If the output image data DAT input from the signal controller 10 does not correspond to the predetermined format, the data driver 20 may switch the lock signal LOCK to be transmitted to the signal controller 10 from a high level to a low level to notify the signal controller 10 that the received output image signal DAT is abnormal.

The digital-analog (DA) converter 30 may generate a scanning start signal STVP, a discharge signal STVP_DC, and a pair of gate clock signals CKV and CKVB based on the vertical synchronization start signal STV and the vertical clock signal CPV (for example, by at least amplifying the voltages of the vertical synchronization start signal STV and the vertical clock signal CPV) and may output the generated signals to the gate driver 40. The DA converter 30 may be an element of a power management integrated circuit (PMIC) or may include a PMIC.

The gate driver 40 may generates a gate-on voltage and a gate-off voltage using the scanning start signal STVP and the pair of gate clock signals CKV and CKVB output by the DA converter 30, and may apply the gate-on voltage and the gate-off voltage to the gate lines in accordance with a suitable timing. The gate driver 40 may be an amorphous silicon gate (ASG) and/or may be directly formed on the display pane 300 together with the gate lines, the data lines, the switching elements, etc.

The gate driver 40 includes a plurality of stages that are dependently connected and sequentially arranged. The plurality of stages may include a plurality of main stages ST1 to STn (n is a natural number) connected to the gate lines G1 to Gn, respectively, and may include one or more dummy stages, such as dummy stages STd1 and STd2. The dummy stages STd1 and STd2 may be connected to the dummy gate lines Gd1 and Gd2, respectively. The dummy gate lines Gd1 and Gd2 are disposed in the peripheral area PA without extending to the display area DA; the dummy gate lines Gd1 and Gd2 are not used for displaying images.

The main stages ST1 to STn are dependently connected and are configured to generate gate signals and to sequentially transmit the gate signals to the gate lines G1 to Gn. The main stages ST1 to STn may have gate signal output terminals (illustrated in FIG. 2) that are connected to the gate lines G1 to Gn, respectively, to output the gate signals.

According to an embodiment of the present invention, the main stages ST1 to STn may be connected to output terminals of respective previous stages ST1 to STn or respective next stages ST1 to STn. In an embodiment, the first main stage ST1 does not have any previous stage, such that no previous stage may be connected with any output terminal of the first main stage ST1. The last main stage STn, or the last main stage STn and the main stage STn−1 in front of the last main stage STn, may be connected to the output terminals of the dummy stages STd1 and STd2.

The main stages ST1 to STn may respectively receive a low voltage that is equivalent to the gate-off voltage through the plurality of control signal lines SL. The main stages ST1 to STn may respectively receive another low voltage lower that is than the gate-off voltage through the plurality of control signal lines SL.

Figure 2:
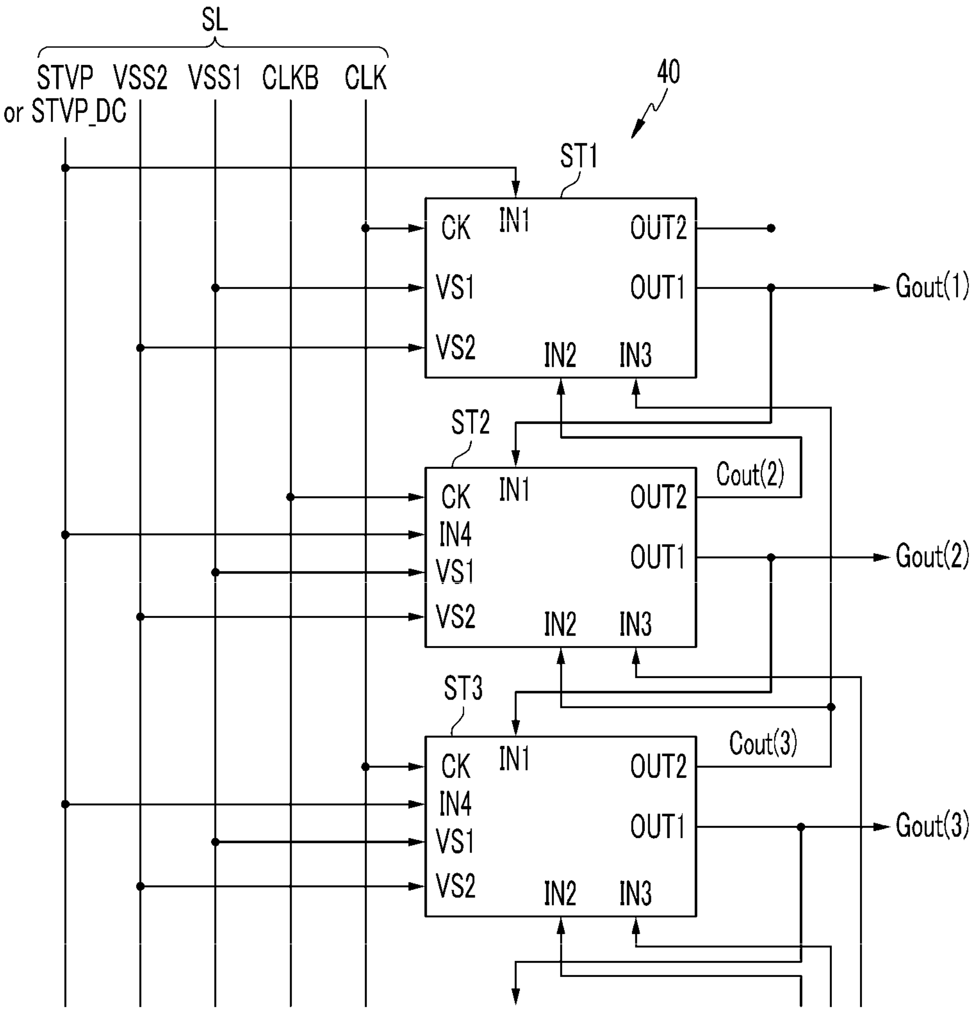
FIG. 2 is a block diagram illustrating a gate driver of the display device according to an embodiment of the present invention.

The main stages ST1 to STn may respectively receive clock signals through the plurality of control signal lines SL. As illustrated in FIG. 2, the clock signals may include a first clock signal CLK and a second clock signal CLKB, which are different from each other. Odd numbered main stages ST1, ST3, etc. may be connected to a first clock signal line and may receive the first clock signal CLK. Even numbered main stages ST2, ST4, etc. may be connected to a second clock signal line and may receive the second clock signal CLKB. A phase of the second clock signal CLKB may be opposite to a phase of the first clock signal CLK.

The main stages ST1 to STn may simultaneously receive a scanning start signal STVP or a discharge signal STVP_DC through a control signal line SL. The scanning start signal STVP is a signal for notifying a start of each frame. When the gate driver 40 receives the scanning start signal STVP, the gate driver 40 sequentially outputs gate pulses from the first main stage ST1, the second main stage ST2, etc. The discharge signal STVP_DC is a signal for discharging charges charged in the main stages ST1 to STn of the gate driver 40 when static electricity is generated or introduced to the display panel 300.

Each of the main stages ST1 to STn and each of the dummy stages STd1 and STd2 may include a plurality of thin film transistors disposed in the peripheral area PA of the display panel 300. Alternatively or additionally, each of the stages may include an active element, such as a diode. Alternatively or additionally, each of the stages may include a passive element, such as a capacitor. The active elements and/or the passive elements included in the gate driver 40 may be fabricated in the same manufacturing step in which the thin film transistors included in the pixels PX of the display area DA are manufactured.

FIG. 2 is a block diagram illustrating the gate driver 40 according to an embodiment of the present invention.

Referring to FIG. 2, the gate driver 40 includes the plurality of stages ST1, . . . , STi, ST(i+1), ST(i+2), . . . , and STn, such as stages ST1, ST2, and ST3, which are dependently connected and are configured to sequentially output gate signals Gout1, . . . , Gout(i), Grout(i+1), Grout (i+2), . . . , and Gout(n), such as Gout(1), Gout(2), and Gout(3). The plurality of control signal lines SL may transmit various gate control signals CLK, CLKB, VSS1, VSS2, STVP, and STVP_DC, which may be received by the stages ST1, . . . , STi, ST(i+1), ST(i+2), . . . and STn and the aforementioned dummy stages STd1 and STd2.

The plurality of control signals lines SL may include, for example, a first clock signal line for transmitting a first clock signal CLK, a second clock signal line for transmitting a second clock signal CLKB (which is different from the first clock signal CLK), a first low voltage line for transmitting a first low voltage VSS1, a second low voltage line for transmitting a second low voltage VSS2, and a scanning start signal line for transmitting the scanning start signal STVP and for transmitting the discharge signal STVP_DC.

Each of the stages ST1, . . . , STi, ST(i+1), ST(i+2), . . . and STn and the dummy stages STd1 and STd2 may include a clock terminal CK, a first (or first-type) low voltage input terminal VS1, a second (or second-type) low voltage input terminal VS2, a first (or first-type) output terminal OUT1, a second (or second-type) output terminal OUT2, a first (or first-type) signal input terminal IN1, a second (or second-type) signal input terminal IN2, and a third (or third-type) signal input terminal IN3. Each of the main stages ST2, . . . , and STn may further include a fourth (or fourth-type) signal input terminal IN4. Each of the first main stage ST1 and the dummy stages STd1 and STd2 may not include the fourth signal input terminal IN4.

One of the first clock signal CLK and the second clock signal CLKB may be input to the clock terminal CK of each of the stages ST1, . . . , STi, ST(i+1), ST(i+2), . . . and STn and each of the stages STd1 and STd2.

For example, the first clock signal CLK may be applied to the clock terminals CK of each of the odd numbered stages ST1, ST3, etc.; the second clock signal CLKB may be applied to the clock terminals CK of the even numbered stages ST2, ST4, etc.

The first low voltage VSS1 and the second low voltage VSS2 may be input to the first low voltage input terminal VS1 and the second low voltage input terminal VS2, respectively. The magnitude of the first low voltage VSS1 may be different from the magnitude of the second low voltage VSS1. According to an embodiment of the present invention, the second low voltage VSS2 may be lower than the first low voltage VSS1. Values of the first low voltage VSS1 and the second low voltage VSS2 may be configured according to particular embodiments and may be equal to or lower than approximately −5 V.

The first output terminals OUT1 may output the gate signals Gout1, . . . , Gout(i), Gout(i+1), Gout(i+2), . . . , and Gout(n) generated by the respective stages ST1, . . . , STi, ST(i+1), ST(i+2), . . . , and STn. The second output terminals OUT2 may output transmittance signals Cout1, . . . , Cout(i), Cout(i+1), Cout(i+2), . . . , and Gout(n) generated by the respective stages ST1, . . . , STi, ST(i+1), ST(i+2), . . . , and STn.

The first signal input terminals IN1 may receive the gate signals Gout1, . . . , Gout(i), Gout(i+1), Gout(i+2), . . . provided by a preceding stage, e.g., the immediately preceding stage. The first main stage ST1 may have no previous stage. The scanning start signal STVP may be input to the first signal input terminal IN1 of the first main stage ST1, and the discharge signal STVP_DC may be input to the first signal input terminal Ni of the first main stage ST1.

The transmittance signals Cout2, . . . , Cout(i), Cout(i+1), Cout(i+2), . . . of provided by a following stage, e.g., the immediately following stage, may be input to the second signal input terminals IN2.

The transmittance signals Cout3, . . . , Cout(i), Cout(i+1), Cout(i+2), . . . of a following stage, e.g., the second following stage that follows the immediately following stage, may be input in the third signal input terminals IN3.

In an embodiment of the present invention, the first dummy stage STd1 may generate a transmittance signal to be input to each of the second signal input terminal IN2 of the last stage STn (e.g., ST3) and the third signal input terminal IN3 of the second-to-last stage ST(n−1) (e.g., ST2). In an embodiment, the second dummy stage STd2 may generate a transmittance signal to be input to the third signal input terminal IN3 of the last stage STn (e.g., ST3).

The scanning start signal STVP may be input to the fourth signal input terminal IN4 of each of the main stages ST2 to STn. The discharge signal STVP-DC may be input to the fourth signal input terminal IN4 of each of the main stages ST2 to STn.

Figure 3:
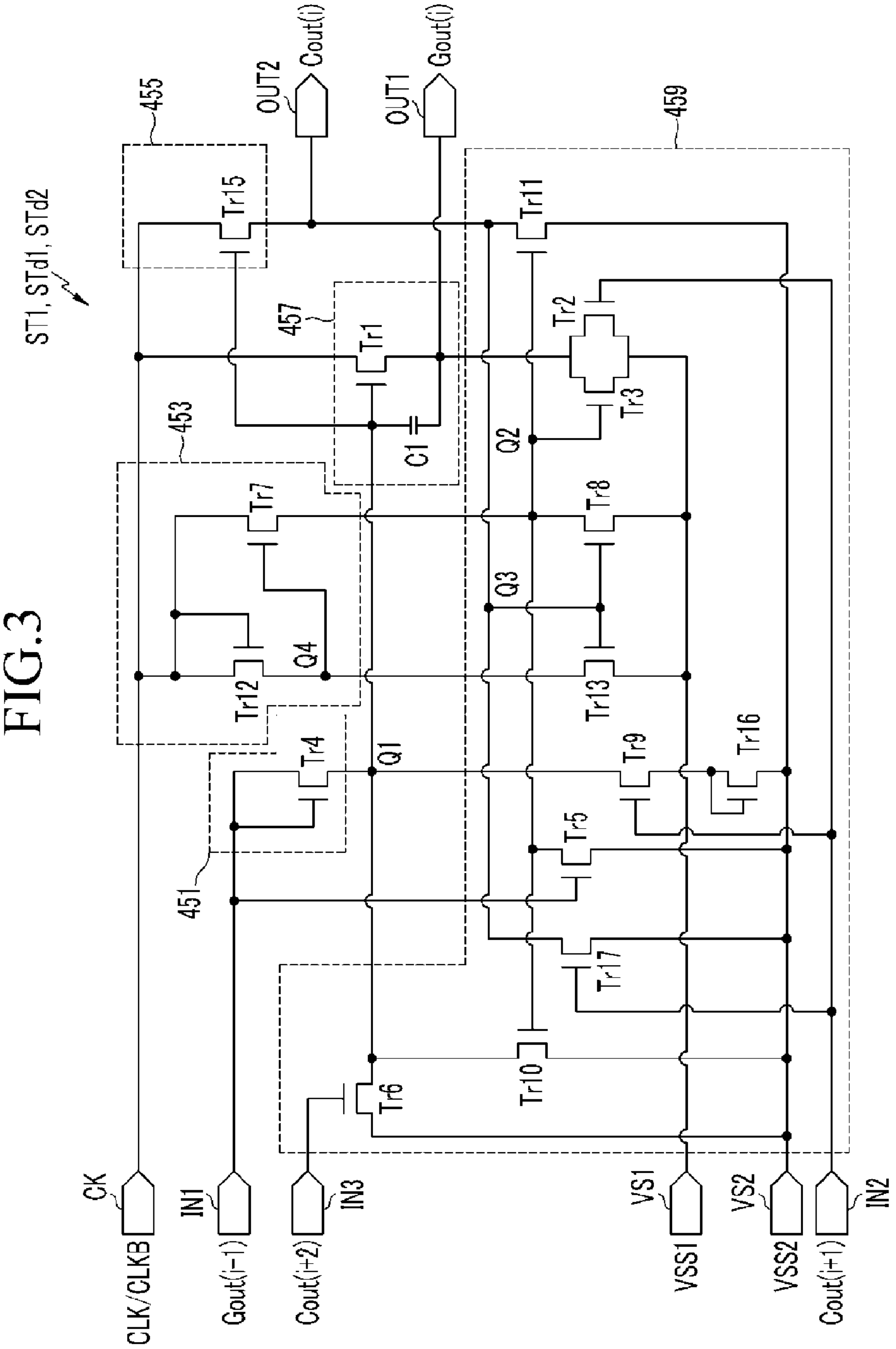
FIG. 3 is a circuit diagram illustrating a first main stage ST1, a dummy stage STd1, or a dummy stage STd2 of the gate driver according to an embodiment of the present invention.
Figure 4:
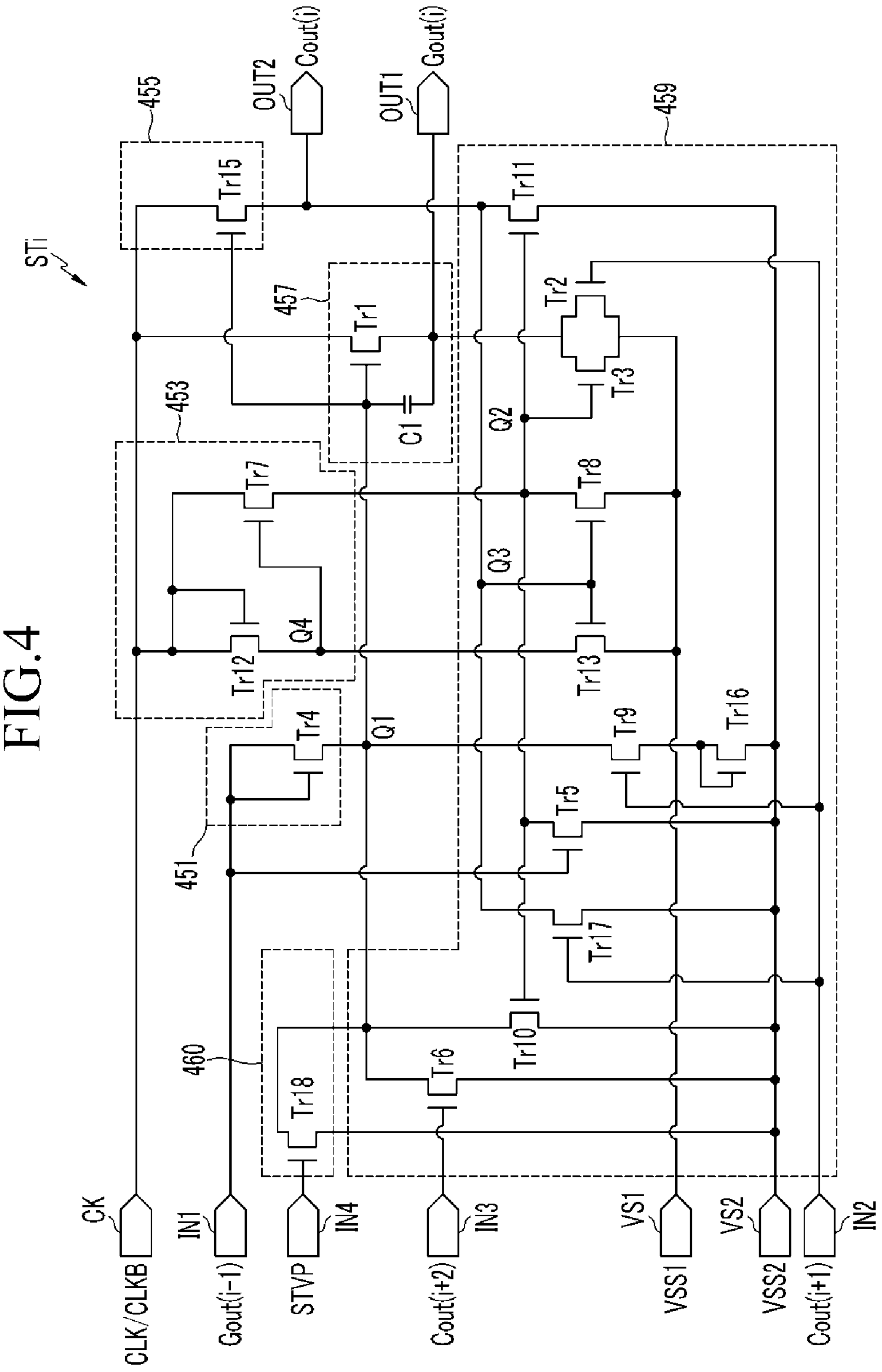
FIG. 4 is a circuit diagram illustrating one of main stages ST2 to STn of the gate driver according to an embodiment of the present invention.

FIG. 3 is a circuit diagram illustrating the first main stage ST1, the first dummy stage STd1, or the second dummy stage STd2 of the gate driver 40 according to an embodiment of the present invention. FIG. 4 is a circuit diagram illustrating one of the main stages ST2 to STn of the gate driver 40 according to an embodiment of the present invention.

Referring to FIG. 3, each of the first main stage ST1, the first dummy stage STd1, and the second dummy stage STd2 may include a plurality of thin film transistors Tr1, Tr2, Tr3, Tr4, Tr5, Tr6, Tr7, Tr8, Tr9, Tr10, Tr11, Tr12, Tr13, Tr15, Tr16, and Tr17, in addition to the aforementioned clock terminal CK, first low voltage input terminal VS1, second low voltage input terminal VS2, first output terminal OUT1, second output terminal OUT2, first signal input terminal IN1, second signal input terminal IN2, and third signal input terminal IN3.

The thin film transistors may form an input unit 451, an inverter unit 453, a transmittance signal unit 455, a pull-up unit 457, and a pull-down unit 459 according to a function.

The input unit 451 is connected with the first signal input terminal IN1 to receive the gate signal Gout(i−1), which may represent the scanning start signal STVP or the discharge signal STVP_DC received by the first main stage ST1, may represent the gate signal Gout(n) received by the first dummy stage STd1, and may represent the first dummy gate signal Gout(d1) received by the second dummy stage STd2. According to an embodiment of the present invention, the input unit 451 includes a fourth (or fourth-type) thin film transistor Tr4. An input terminal and a control terminal of the fourth thin film transistor Tr4 are both connected (diode connected) to the first signal input terminal Ni, and an output terminal of the fourth thin film transistor Tr4 is connected to a contact point Q1 (or node Q1). When the gate signal Gout(i−1) is a gate-on voltage, the input terminal of the fourth thin film transistor Tr4 may be connected to the output terminal of the fourth thin film transistor Tr4 to output the gate-on voltage. When the gate signal Gout(i−1) is a gate-off voltage, the input terminal of the fourth thin film transistor Tr4 may be disconnected from the output terminal of the fourth thin film transistor Tr4.

The inverter unit 453 is connected to the clock terminal CK and contact points (or nodes) Q2 and Q4. The inverter unit 453 may output a signal having a phase that is opposite to the phase of the gate signal Gout(i). In an embodiment, the phase of the signal at the contact point Q2, which is connected to the output of the inverter unit 453, is opposite to a phase of the signal at a contact point Q3, which is connected to at least one of the second output terminal OUT2 and the first output terminal OUT1. The output signal of the inverter unit 453 or the signal at the contact point Q2 may be referred to as an inverter signal. According to an embodiment of the present invention, the inverter unit 453 may include a seventh thin film transistor Tr7 and a twelfth thin film transistor Tr12. A control terminal and an input terminal of the twelfth thin film transistor Tr12 are both connected to the clock terminal CK, and an output terminal of the twelfth thin film transistor Tr12 is connected to the contact point Q4. A control terminal of the seventh thin film transistor Tr7 is connected to the contact point Q4, an input terminal of the seventh thin film transistor Tr7 is connected to the clock terminal CK, and an output terminal of the seventh thin film transistor Tr7 is connected to the contact point Q2. Parasitic capacitors (not illustrated) may be provided between the input terminal and the control terminal of the seventh thin film transistor Tr7, and between the control terminal and the output terminal of the seventh thin film transistor Tr7, respectively. When the clock signal CLK or CLKB received from the clock terminal CK have the high level, the twelfth thin film transistor Tr12 is turned on, the seventh thin film transistor Tr7 is also turned on, and thus a voltage of the contact point Q2 becomes a high level. When the clock signal CLK or CLKB received from the clock terminal CK have the low level, the twelfth thin film transistor Tr12 is turned off, and operation of the seventh thin film transistor Tr7 is changed according to a voltage of the contact point Q4. When the voltage of the contact point Q4 is high, the seventh thin film transistor Tr7 is turned on to transmit the clock signal CLK or CLKB of the low level to the contact point Q2. When the voltage of the contact point Q4 is low, the seventh thin film transistor Tr7 is turned off.

The transmittance signal unit 455 is connected to the clock terminal CK, the contact point Q1, and the second output terminal OUT2. The transmittance signal unit 455 may output the transmittance signal Cout(i) through the second output terminal OUT2. According to an embodiment, the transmittance signal unit 455 may include a fifteenth thin film transistor Tr15. The input terminal of the fifteenth thin film transistor Tr15 is connected to the clock terminal CK, the control terminal of the fifteenth thin film transistor Tr15 is connected to the contact point Q1, and the output terminal of the fifteenth thin film transistor Tr15 is connected to the second output terminal OUT2 and the contact point Q3. When the voltage of the contact point Q1 is high, the clock signal CLK or CLKB received from the clock terminal CK is output to the second output terminal OUT2. When the voltage of the contact point Q1 is low, the voltage of the contact point Q3 is output to the second output terminal OUT2. A parasitic capacitor (not illustrated) may be provided between the control terminal and the output terminal of the fifteenth thin film transistor Tr15.

The pull-up unit 457 is connected to the clock terminal CK, the contact point Q1, and the first output terminal OUT1. The pull-up unit 457 may output the gate signal Gout(i) through the first output terminal OUT1. According to an embodiment, the pull-up unit 457 includes a first thin film transistor Tr1 and a capacitor C1. The control terminal of the first thin film transistor Tr1 is connected to the contact point Q1, the input terminal of the first thin film transistor Tr1 is connected to the clock terminal CK, and the output terminal of the first thin film transistor Tr1 is connected to the first output terminal OUT1. The capacitor C1 is connected between the control terminal and the output terminal of the first thin film transistor Tr1. When the voltage of the contact point Q1 is high, the clock signal CLK or CLKB received from the clock terminal CK may be output to the first output terminal OUT1. When the voltage of the contact point Q1 is low, the first thin film transistor Tr1 is turned off, and a low voltage received from the pull-down unit 459 is output to the first output terminal OUT1.

The pull-down unit 459 may stably output the gate signal Gout(i) and the transmittance signal Cout(i) by decreasing potentials of the contact points Q1 and Q2, decreasing the transmittance signal Cout(i), and/or decreasing the gate signal Gout(i). The pull-down unit 459 includes a second thin film transistor Tr2, a third thin film transistor Tr3, a fifth thin film transistor Tr5, a sixth thin film transistor Tr6, an eighth thin film transistor Tr8, a ninth thin film transistor Tr9, a tenth thin film transistor Tr10, an eleventh thin film transistor Tr11, a thirteenth thin film transistor Tr13, a sixteenth thin film transistor Tr16, and a seventeenth thin film transistor Tr17.

The sixth thin film transistor Tr6, the ninth thin film transistor Tr9, the tenth thin film transistor Tr10, and/or the sixteenth thin film transistor Tr16 may pull down the voltage of the contact point Q1.

The sixth thin film transistor Tr6 may be turned on according to the transmittance signal Cout(i+2), which may be provided by the second following stage and which may represent Cout(3) received by stage ST1, to decrease the voltage of the contact point Q1 to the second low voltage VSS2. A control terminal of the sixth thin film transistor Tr6 is connected to the third signal input terminal IN3, an input terminal of the sixth thin film transistor Tr6 is connected to the second low voltage input terminal VS2, and an output terminal of the sixth thin film transistor Tr6 is connected to the contact point Q1. The dummy stages STd1 and STd2 may be configured to transmit the transmittance signals Cout (n+1) and Cout(n+2) to the third signal input terminals IN3 of the second-to-last stage ST(n−1) and the last main stage STn, respectively.

The ninth thin film transistor Tr9 and the sixteenth thin film transistor Tr16 may be turned on according to the transmittance signal Cout(i+1), which may be provided by the next stage, to pull down the voltage of the contact point Q1 to, for example, the second low voltage VSS2. A control terminal of the ninth thin film transistor Tr9 is connected to the second signal input terminal IN2, a first input/output terminal of the ninth thin film transistor Tr9 is connected to the contact point Q1, and a second input/output terminal of the ninth thin film transistor Tr9 is connected to the sixteenth thin film transistor Tr16. A control terminal and an output terminal of the sixteenth thin film transistor Tr16 are both connected (diode connected) to the second input/output terminal of the ninth thin film transistor Tr9, and an input terminal of the sixteenth thin film transistor Tr16 is connected to the second low voltage input terminal VS2. The dummy stage STd1 may transmit the transmittance signal Cout(n+1) to the second signal input terminal IN2 of the last main stage STn.

The tenth thin film transistor Tr10 may decrease the voltage of the contact point Q1 to the second low voltage VSS2 when the signal of the contact point Q2 has a high level. A control terminal of the tenth thin film transistor Tr10 is connected to the contact point Q2, an input terminal of the tenth thin film transistor Tr10 is connected to the second low voltage input terminal VS2, and an output terminal of the tenth thin film transistor Tr10 is connected to the contact point Q1.

The voltage of the contact point Q2 may be pulled down by the fifth thin film transistor Tr5, the eighth thin film transistor Tr8, and/or the thirteenth thin film transistor Tr13.

The fifth thin film transistor Tr5 may decrease the voltage of the contact point Q2 to the second low voltage VSS2 according to the gate signal Gout(i−1), which may represent the scanning start signal STVP or the discharge signal STVP_DC received by the first main stage ST1, may represent the gate signal Gout(n) received by the first dummy stage STd1, and may represent the first dummy gate signal Gout(d1) received by the second dummy stage STd2. A control terminal of the fifth thin film transistor Tr5 is connected to the first signal input terminal IN1, an input terminal of the fifth thin film transistor Tr5 is connected to the second low voltage input terminal VS2, and an output terminal of the fifth thin film transistor Tr5 is connected to the contact point Q2 and a control terminal of the tenth thin film transistor Tr10.

The eighth thin film transistor Tr8 and the thirteenth thin film transistor Tr13 may decrease the voltage of the contact point Q2 to the first low voltage VSS1 according to the voltage of the contact point Q3 and/or the transmittance signal Cout(i). A control terminal of the eighth thin film transistor Tr8 is connected to the second output terminal OUT2 and/or the contact point Q3, an input terminal of the eighth thin film transistor Tr8 is connected to the first low voltage input terminal VS1, and an output terminal of the eighth thin film transistor Tr8 is connected to the contact point Q2. A control terminal of the thirteenth thin film transistor Tr13 is connected to the second output terminal OUT2 and/or the contact point Q3, an input terminal of the thirteenth thin film transistor Tr13 is connected to the first low voltage input terminal VS1, and an output terminal of the thirteenth thin film transistor Tr13 is connected to the contact point Q4. The thirteenth thin film transistor Tr13 may turn off the seventh thin film transistor Tr7 by decreasing a potential of the contact point Q4 to the first low voltage VSS1 according to the voltage of the contact point Q3 or the transmittance signal Cout(i). Accordingly, the voltage of the contact point Q2 is maintained at the first low voltage VSS1 input through the eighth thin film transistor Tr8, given that the clock signal CLK or CLKB is not provided to the contact point Q2 through the seventh thin film transistor Tr7.

The voltage of the transmittance signal Cout(i) may be decreased by the eleventh thin film transistor Tr11 and/or the seventeenth thin film transistor Tr17.

When the voltage of the contact point Q2 (received by a control terminal of the eleventh thin film transistor Tr11) is high, the voltage of the transmittance signal Cout(i) is decreased to the second low voltage VSS2. A control terminal of the eleventh thin film transistor Tr11 is connected to the contact point Q2, an input terminal of the eleventh thin film transistor Tr11 is connected to the second low voltage input terminal VS2, and an output terminal of the eleventh thin film transistor Tr11 is connected to the second output terminal OUT2.

The seventeenth thin film transistor TR17 may decrease the voltage of the second output terminal OUT2 to the second low voltage VSS2 according to the transmittance signal Cout(i+1) of the next stage. The seventeenth thin film transistor Tr17 may assist on operation of the eleventh thin film transistor Tr11. A control terminal of the seventeenth thin film transistor Tr17 is connected to the second signal input terminal IN2, an input terminal of the seventeenth thin film transistor Tr17 is connected to the second low voltage input terminal VS2, and an output terminal of the seventeenth thin film transistor Tr17 is connected to the second output terminal OUT2. The second dummy stage STd2 may not have a corresponding next stage.

The voltage of the gate signal Gout(i) may be decreased by the second thin film transistor Tr2 and/or the third thin film transistor Tr3.

The second thin film transistor Tr2 may change the gate signal Gout(i) of the present stage to the first low voltage VSS1 according to the transmittance signal Cout(i+1) of the next stage. A control terminal of the second thin film transistor Tr2 is connected to the second signal input terminal IN2, an input terminal of the second thin film transistor Tr2 is connected to the first low voltage input terminal VS1, and an output terminal of the second thin film transistor Tr2 is connected to the first output terminal OUT1. According to an embodiment of the present invention, the input terminal of the second thin film transistor Tr2 may be connected to the second low voltage input terminal VS2.

When the voltage of the contact point Q2 is high, the third thin film transistor Tr3 changes the gate signal Gout(i) of the present stage to the first low voltage VSS1. A control terminal of the third thin film transistor Tr3 is connected to the contact point Q2, an input terminal of the third thin film transistor Tr3 is connected to the first low voltage input terminal VS1, and an output terminal of the third thin film transistor Tr3 is connected to the first output terminal OUT1.

Referring to FIG. 4, each of the main stages ST2 to STn of the gate driver 40 may further include the fourth signal input terminal IN4 and the eighteenth thin film transistor Tr18, in addition to the elements of the first main stage ST1, the first dummy stage STd1, and/or the second dummy stage STd2 discussed with reference to FIG. 3.

An output terminal of the eighteenth thin film transistor Tr18 is connected to the contact point Q1, an input terminal of the eighteenth thin film transistor Tr18 is connected to the second low voltage input terminal VS2, and a control terminal of the eighteenth thin film transistor Tr18 is connected to the fourth signal input terminal IN4. The fourth signal input terminal IN4 is connected to the scanning start signal line to receive the scanning start signal STVP and to receive the discharge signal STVP_DC. The eighteenth thin film transistor Tr18 may be turned on according to the scanning start signal STVP or the discharge signal STVP_DC to decrease the voltage of the contact point Q1 to the second low voltage VSS2, thereby discharging charges charged in the capacitor C1. The eighteenth thin film transistor Tr18 may form a discharge unit 460.

When the charges charged in the capacitor C1 are discharged and when the contact point Q1 is maintained at the second low voltage VSS2, the first thin film transistor Tr1 is turned off, so that the gate signal Gout(i) is maintained at the gate-off voltage Voff.

Regarding the first main stage ST1, when the discharge signal STVP_DC is input through the first signal input terminal IN1, the discharge signal STVP_DC is applied to the contact point Q1 through the fourth thin film transistor Tr4, so that the first thin film transistor Tr1 is turned on. Nevertheless, the clock signal CLK received by at least the first main stage ST1 (and additionally the clock signal CLKB) input through the clock terminals CK may be maintained at the off level. As a result, the gate signal Gout(1) of the first main stage ST1 may also be maintained at the gate-off voltage Voff. Accordingly, the voltage that has been charged in the previous frame is maintained in each pixel electrode of the display panel 300 without change, such that an image displayed just before failure (caused by static electricity) is continuously displayed on the display panel 300. Advantageously, a viewer of the display panel 300 may not perceive abnormal artifacts or distortion in the displayed image.

Subsequently, when the output image signal DAT becomes normal, the signal controller 10 may normally transmit the vertical synchronization start signal STV and the vertical clock signal CPV to the DA converter 30. Accordingly, a normal image for the next frame may be displayed in accordance with the vertical synchronization start signal STV.

Figure 5:
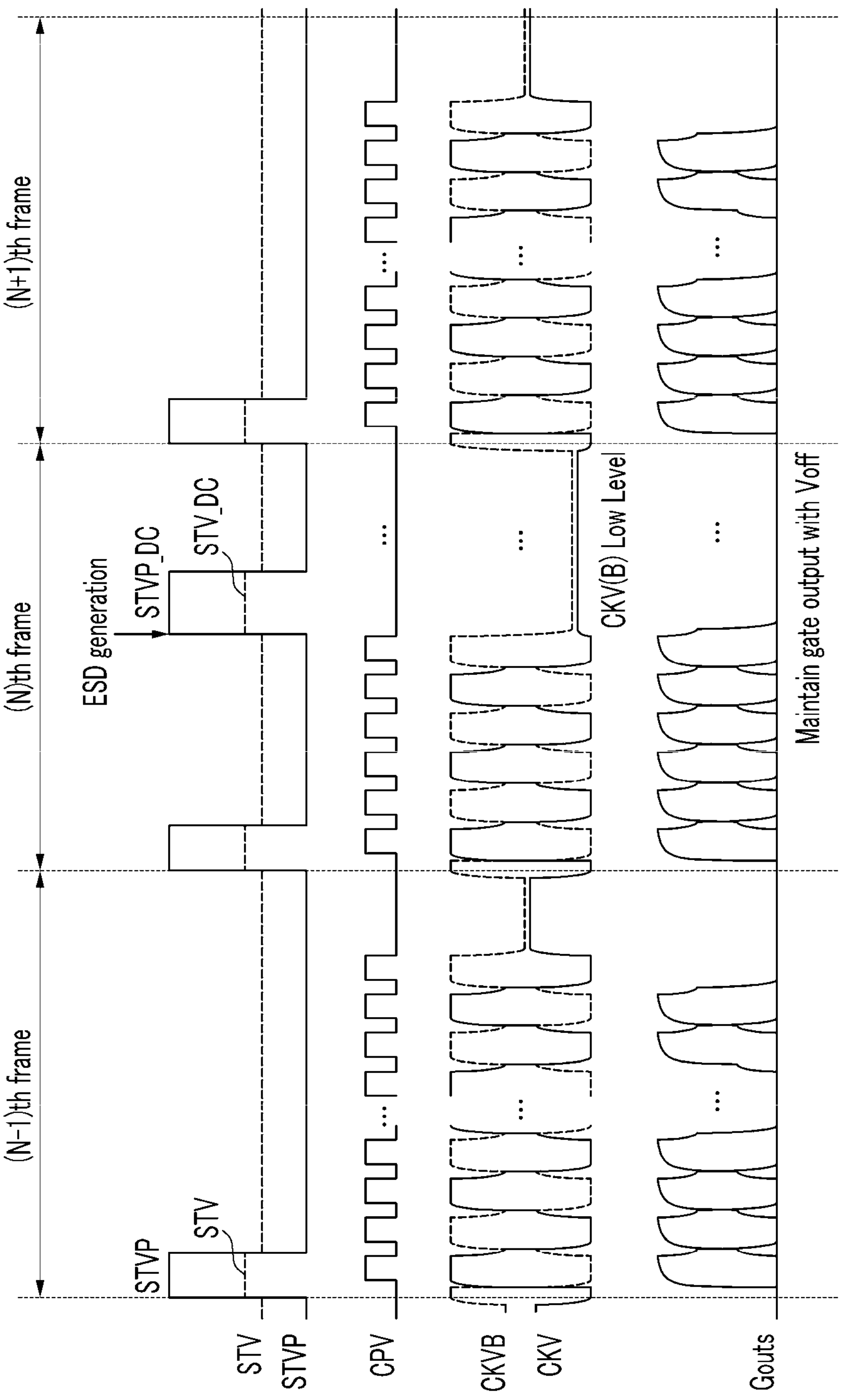
FIG. 5 is a waveform diagram illustrating signals of a signal controller, a DA converter, and the gate driver of the display device according to an embodiment of the present invention.

FIG. 5 is a waveform diagram illustrating signals of the signal controller 10, the DA converter 30, and the gate driver 40 of the display device according to an embodiment of the present invention.

Referring to FIG. 1 and FIG. 5, e.g., in the (N)th frame, when static electricity or electrostatic discharge (ESD) is generated or introduced so that abnormalities occur in the output image signal DAT transmitted to the data driver, the output image signal DAT does not substantially correspond to a predetermined format. The data driver 20 may determine that the output image signal DAT does not correspond to the predetermined format and may notify the signal controller 10 of the reception of the abnormal output image signal DAT by switching the lock signal LOCK to be transmitted to the signal controller 10 from a high level to a low level (i.e., by providing a low-level lock signal LOCK to the signal controller 10).

After receiving the low-level lock signal LOCK, the signal controller 10 may switch a level of the vertical clock signal CPV to a low level, may generate the discharge indication signal STV_DC (illustrated in FIG. 5), and may provide the generated discharge indication signal STV_DC to the DA converter 30.

The DA converter 30 may generate the discharge signal STVP_DC (illustrated in FIG. 5) in accordance with the discharge indication signal STV_DC, may provide the generated discharge signal STVP_DC to the gate driver 40, and may maintain the gate clock signals CLK and CLKB at the off level.

After receiving the discharge signal STVP_DC and the gate clock signals CLK and CLKB of the off level, the gate driver 40 may maintain the gate signals provided to all of the gate lines G1 to Gn at the gate-off voltage Voff.

As a result, the voltage that has been charged in the previous frame is maintained in each pixel electrode of the display panel 300 without substantial change. Accordingly, the image that has been displayed just before the abnormality (caused by static electricity) may continue to be displayed on the display panel 300.

Subsequently, e.g., in the (N+1)th frame, when the data driver 20 receives a normal output image signal DAT that corresponds to the predetermined format, the data driver 20 may notify the signal controller 10 of the normality of the output image signal DAT by switching the lock signal LOCK to be transmitted to the signal controller 10 from the low level to the high level (i.e., by providing a high-level lock signal LOCK to the signal controller 10). Accordingly, the signal controller 10 may normally transmit a vertical synchronization start signal STV and a vertical clock signal CPV to the DA converter 30. The image for the next frame may be displayed in accordance with the vertical synchronization start signal STV.

Since most videos may not involve extremely rapidly changes in images, even though a previous image (instead of a current image) is displayed for a short time, a viewer may not substantially perceive any abnormality. Advantageously, satisfactory image quality and satisfactory viewer experience may be provided.

While this invention has been described in connection with what is presently considered to be practical embodiments, it is to be understood that the invention is not limited to the disclosed embodiments. This invention is intended to cover various modifications and equivalent arrangements included within the spirit and scope of the appended claims.

What is claimed is:

1. A display device comprising:

a plurality of pixels;

a plurality of gate lines;

a gate driver configured to provide a plurality of gate signals through the plurality of gate lines to the plurality of pixels according to at least one of a discharge signal and a scanning start signal for controlling the plurality of pixels, the gate driver being configured to provide a plurality of gate-off signals through the plurality of gate lines to the plurality of pixels according to the discharge signal to cause the display device to continue displaying a previous-frame image; and a signal provider configured to provide the discharge signal and an off-level gate clock signal to the gate driver in response to a determination performed by the signal provider that an image signal is abnormal, wherein the signal provider comprises a data driver configured to receive the image signal, configured to provide a plurality of data signals to the plurality of pixels, and configured to determine whether the image signal is abnormal.

2. The display device of claim 1, wherein the signal provider further comprises a signal controller configured to provide the image signal, and wherein the data driver is configured to compare the image signal with a predetermined format for determining whether the image signal is abnormal.

3. The display device of claim 1, wherein the plurality of pixels includes a first pixel, a second pixel, and a third pixel, wherein the plurality of gate lines includes a first gate line, a second gate line, and a third gate line, wherein the gate driver comprises a first stage, a second stage, and a third stage, wherein the first stage is electrically connected through the first gate line to the first pixel, wherein the second stage is electrically connected through the second gate line to the second pixel, wherein the third stage is electrically connected through the third gate line to the third pixel, and wherein each of the second stage and the third stage includes at least one more signal input terminal than the first stage.

4. The display device of claim 3, wherein each of the first stage, the second stage, and the third stage comprises an input unit, an inverter unit, a transmittance signal unit, a pull-up unit, and a pull-down unit, wherein each of the second stage and the third stage additionally comprises a discharge unit, and wherein the first stage does not include the discharge unit.

5. The display device of claim 4, wherein the discharge unit is configured to discharge, in response to the discharge signal, a charge that has been charged in the pull-up unit.

6. The display device of claim 4, further comprising a scanning start signal line configured to transmit at least one of the discharge signal and the scanning start signal, the scanning start signal line being electrically connected to each of the input unit of the first stage, the discharge unit of the second stage, and the discharge unit of the third stage.

7. The display device of claim 6, wherein the gate driver further comprises a second-to-last stage, a last stage, a first dummy stage, and a second dummy stage, wherein each of the first dummy stage and the second dummy stage is not electrically connected to any pixel, wherein a first signal input terminal of the last stage is electrically connected to a signal output terminal of the second-to-last stage, wherein a second signal input terminal of the last stage is electrically connected to a signal output terminal of the first dummy stage, wherein a third signal input terminal of the last stage is electrically connected to a signal output terminal of the second dummy stage, and wherein a fourth signal input terminal of the last stage is electrically connected to the scanning start signal line.

8. The display device of claim 6, wherein the second stage comprises a clock signal terminal, a gate signal output terminal, and a first voltage input terminal, wherein the pull-up unit of the second stage comprises a pull-up transistor and a capacitor, wherein an input terminal of the pull-up transistor is electrically connected to the clock signal terminal, wherein an output terminal of the pull-up transistor is electrically connected to the gate signal output terminal, wherein a control terminal of the pull-up transistor is electrically connected to the discharge unit of the second stage, wherein the capacitor is electrically connected between the control terminal of the pull-up transistor and the output terminal of the pull-up transistor, wherein the discharge unit of the second stage comprises a discharge transistor, wherein an input terminal of the discharge transistor is electrically connected to the first voltage input terminal, wherein an output terminal of the discharge transistor is electrically connected to the control terminal of the pull-up transistor, wherein a control terminal of the discharge transistor is electrically connected to the scanning start signal line, wherein the input unit of the second stage comprises an input transistor, wherein each of an input terminal of the input transistor and a control terminal of the input transistor is electrically connected to a gate signal output terminal of the first stage, and wherein an output terminal of the input transistor is electrically connected to the control terminal of the pull-up transistor.

9. The display device of claim 8, wherein the second stage further comprises a second voltage input terminal, wherein the pull-down unit of the second stage comprises a pull-down transistor, wherein an input terminal of the pull-down transistor is electrically connected to the second voltage input terminal, wherein the inverter unit of the second stage comprises a first inverter transistor and a second inverter transistor, wherein each of a first terminal of the first inverter transistor and a control terminal of the second inverter transistor is electrically connected to an output terminal of the pull-down transistor, and wherein each of a second terminal of the first inverter transistor, a control terminal of the first inverter transistor, and an input or output terminal of the second inverter transistor is electrically connected to the clock signal terminal.

10. The display device of claim 9, wherein a voltage at the first voltage input terminal is lower than a voltage at the second voltage input terminal.

11. The display device of claim 8, wherein the input unit of the first stage includes a switching element, wherein each of an input terminal of the input transistor and a control terminal of the switching element is electrically connected to the scanning start signal line, and wherein an output terminal of the switching element is electrically connected to a control terminal of the pull-up unit of the first stage.

12. The display device of claim 8, wherein the signal provider further comprises:

a digital-analog converter configured to provide at least one of the discharge signal and the scanning start signal to the gate driver; and a signal controller configured to provide the image signal, wherein the signal controller is configured to provide a discharge indication signal to the digital-analog converter when the image signal is abnormal, and wherein the digital-analog converter is configured to generate the discharge signal according to the discharge indication signal.

13. The display device of claim 12, wherein the data driver is configured to provide a first-state lock signal to the signal controller if the image signal is determined to be normal, wherein the data driver is configured to provide a second-state lock signal to the signal controller if the image signal is determined to be abnormal, and wherein the first-state lock signal is different from the second-state lock signal.

14. The display device of claim 13, wherein the signal controller is configured to provide a first-level vertical clock signal to the digital-analog converter in response to the first-state lock signal, wherein the signal controller is configured to provide a second-level vertical clock signal to the digital-analog converter in response to the second-state lock signal, and wherein the digital-analog converter is configured to provide the off-level gate clock signal to the gate driver in response to the second-level vertical clock signal.

15. A method for operating a display device, the display device comprising a plurality of pixels, a plurality of gate lines, and a gate driver electrically connected though the plurality of gate lines to the plurality of pixels, the method comprising:

determining, using a data driver in a signal provider that includes hardware, whether an image signal is abnormal, wherein the signal provider comprises the gate driver and the data driver, and wherein the data driver is configured to receive the image signal and is configured to provide a plurality of data signals to the plurality of pixels;

in response to a determination that the image signal is abnormal, using the signal provider to provide a discharge signal and an off-level gate clock signal to the gate driver; and using the gate driver to provide, in response to the discharge signal and the off-level gate clock signal, a plurality of gate-off signals through the plurality of gate lines to the plurality of pixels to cause the display device to continue displaying a previous-frame image.

16. The method of claim 15, further comprising transmitting the discharge signal through a scanning start signal line to the gate driver, wherein the gate driver is configured to receive a scanning start signal that is transmitted through the scanning start signal line.

17. The method of claim 15, further comprising:

in response to the determination that the image signal is abnormal, using a digital-analog converter of the signal provider to provide the off-level gate clock signal to the gate driver.

18. The method of claim 15, wherein the gate driver comprising a first stage and a second stage, the method further comprising:

providing a first copy of the discharge signal to a first signal input terminal of the first stage;

providing a first copy of a first gate signal from the first stage to a first pixel of the plurality of pixels;

providing a second copy of the first gate signal from the first stage to a first signal input terminal of the second stage; and providing a second copy of the discharge signal to a second signal input terminal of the second stage.

19. The method of claim 15, wherein the gate driver comprising a second-to-last stage, a last stage, a first dummy stage, and a second dummy stage, each of the first dummy stage and the second dummy stage being not electrically connected to any pixel, the method further comprising:

providing a gate signal from the second-to-last stage to a first signal input terminal of the last stage;

providing a first transmittance signal from the first dummy stage to a second signal input terminal of the last stage;

providing a second transmittance signal from the second dummy stage to a third signal input terminal of the last stage; and providing a copy of the discharge signal to a fourth signal input terminal of the last stage.

* * * * *